(12) United States Patent
Chevion et al.

(10) Patent No.: US 8,494,273 B2
(45) Date of Patent: Jul. 23, 2013

(54) ADAPTIVE OPTICAL CHARACTER RECOGNITION ON A DOCUMENT WITH DISTORTED CHARACTERS

(75) Inventors: Dan Shmuel Chevion, Haifa (IL); Vladimir Kluzner, Haifa (IL); Asaf Tzadok, Nesher (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 12/876,145

(22) Filed: Sep. 5, 2010

(65) Prior Publication Data

US 2012/0099792 A1   Apr. 26, 2012

(51) Int. Cl.
  *G06K 9/00* (2006.01)
  *G06K 9/48* (2006.01)
(52) U.S. Cl.
  USPC ............................ 382/182; 382/168; 382/197
(58) Field of Classification Search
  USPC ................ 382/182, 100, 177, 173, 181, 190, 382/290, 292, 301, 321
  See application file for complete search history.

(56) References Cited

U.S. PATENT DOCUMENTS

| | | | | |
|---|---|---|---|---|
| 6,269,171 | B1 * | 7/2001 | Gozzo et al. | 382/101 |
| 7,283,669 | B2 * | 10/2007 | Andel et al. | 382/177 |
| 7,474,759 | B2 * | 1/2009 | Sternberg et al. | 382/100 |
| 7,519,221 | B1 | 4/2009 | Nicholson | |
| 8,014,604 | B2 * | 9/2011 | Tzadok et al. | 382/177 |
| 2009/0220175 | A1 | 9/2009 | Tzadok et al. | |
| 2009/0263019 | A1 | 10/2009 | Tzadok et al. | |

OTHER PUBLICATIONS

Free eBooks by Project Gutenberg. URL: http://www.gutenberg.org.
Impact Project. URL: http://www.impact-project.eu.
Raj Reddy and Gloriana StClair, "The Million Book Digital Library Project". URL: http://www.rr.cs.cmu.edu/mbdl.htm.
A. Abdulkader and M. R. Casey, "Low cost correction of OCR errors using learning in a multi-engine environment". In Proc. of 10th Int. Conf. on Document Analysis and Recognition, pp. 576-580, Barcelona, Spain, Aug. 2009.
H. Balk, "Responding to the challenges in mass digitization of historical printed text". In the IMPACT workshop at the Eva Minerva Conf., Jerusalem, Israel, Nov. 2008.
T. Brox et al., "High accuracy optical flow estimation based on a theory for warping". In Proc. of 8th European Conf. on Computer Vision, vol. 4 of LNCS 3024, T. Pajdla and J. Matas (Eds.), pp. 25-36, Prague, Czech Republic, May 2004.
V. Kluzner et al., "Word-based adaptive OCR for historical books". In Proc. of 10th Int. Conf. on Document Analysis and Recognition, pp. 501-505, Barcelona, Spain, Aug. 2009.
V. Kluzner et al., "Hybrid approach to adaptive OCR". 20th Int. Conf. on Pattern Recognition (ICPR'10), Istanbul, Turkey, Aug. 2010.

(Continued)

*Primary Examiner* — Sheela Chawan (57) ABSTRACT

A computer implemented method for adaptive optical character recognition on a document with distorted characters includes performing a distortion-correction transformation on a segmented character of the document assuming the segmented character to be a candidate character. The method further includes comparing the transformed segmented character to the candidate character by calculating a comparison score. If the calculated score is within a predetermined range, the segmented character is identified with the candidate character. The method may be implemented in either of computer hardware configured to perform the method, or in computer software embodied in a non-transitory, tangible, computer-readable storage medium. Also disclosed are corresponding computer program product and data processing system.

20 Claims, 5 Drawing Sheets

OTHER PUBLICATIONS

F. Shafait et al., "Background variability modeling for statistical layout analysis". In Proc. of 19th Int. Conf. on Pattern Recognition (ICPR'08), vol. 1, pp. 1-4, Tampa, Florida, USA, Dec. 2008.

Z. Shi and V. Govindaraju, "Historical document image enhancement using background light intensity normalization". In Proc. of 17th Int. Conf. on Pattern Recognition (ICPR'04), vol. 1, pp. 473-476, Cambridge, England, UK, Aug. 2004.

D. Suter, "Motion estimation and vector splines". In Proc. of CVPR94, pp. 939-942, Seattle, WA, Jun. 1994.

L. Vincent, "Google book search: Document understanding on a massive scale". In Proc. of 9th Int. Conf. on Document Analysis and Recognition, pp. 819-823, Curtuba, Brazil, Sep. 2007.

Y. Wang et al., "Statistical-based approach to word segmentation". In Proc. of 15th Int. Conf. on Pattern Recognition (ICPR'00), vol. 4, pp. 4555-4558, Barcelona, Spain, Sep. 2000.

Cecotti, H. et al., "Hybrid OCR Combination for Ancient Documents", Pattern Recognition and Data Mining. Third International Conference on Advances in Pattern Recognition, ICAPR 2005. Proceedings, Part I (Lecture Notes in Computer Science vol. 3686), 646-53, 2005. Publisher: Springer-Verlag, Berlin, Germany.

Vamvakas, G. et al., "A complete optical character recognition methodology for historical documents", DAS 2008—Proceedings of the 8th IAPR International Workshop on Document Analysis Systems, p. 525-532, 2008. Publisher: Inst. of Elec. and Elec. Eng. Computer Society.

Stefan Pletschacher, "A Self-Adaptive Method for Extraction of Document-Specific Alphabets", IEEE 2009.

* cited by examiner

ADAPTIVE OPTICAL CHARACTER RECOGNITION ON A DOCUMENT WITH DISTORTED CHARACTERS

BACKGROUND

The present invention relates to optical character recognition (OCR). More specifically the present invention relates to adaptive OCR on a document with distorted characters.

OCR technology has been used for decades for converting scanned images of documents to indexable text. The accuracy of commercially available OCR engines has constantly improved, to the extent that the OCR problem has been sometimes regarded as solved. However, although the accuracy of such OCR engines may be sufficient for occasional home or business use, the accuracy may not be sufficient for heavier use. For example, a typical mean error rate at the word level ranging from about 1% to 10% may not be adequate for many information retrieval applications. For example, even a relatively low error rate may not provide sufficient accuracy to efficiently convert an entire library, or other large collection of books.

OCR typically begins with segmenting a scanned or otherwise acquired image of a text into separate characters. Once segmented, an OCR system or method may apply one or more techniques to identify a segmented character. The system or method may then incorporate the identified character into indexable text.

For example, OCR technology may include template matching, in which a segmented character is compared against templates of various characters. A template matching algorithm may assign a score that rates the similarity between the segmented character and the template. For example, assigning a score may include application of a classification algorithm such as a neural network or a support vector machine (SVM).

As another example, OCR technology may be feature based, extracting one or more features from a segmented character. A feature based OCR algorithm may then employ a classification algorithm, such as one of the classification algorithms mentioned above, to compare the extracted features against features characterizing a previously identified character.

SUMMARY

According to embodiments of the present invention there is provided a computer implemented method for performing adaptive optical character recognition on a document with distorted characters. The method includes: performing a distortion-correction transformation on a segmented character of the document assuming the segmented character to be a candidate character; and comparing the transformed segmented character to the candidate character by calculating a comparison score and, if the calculated score is within a predetermined range, identifying the segmented character with the candidate character.

Furthermore, in accordance with embodiments of the present invention, there is provided a computer program product stored on a non-transitory tangible computer readable storage medium for performing adaptive optical character recognition on a document with distorted characters. The method includes: performing a distortion-correction transformation on a segmented character of the document assuming the segmented character to be a candidate character; and comparing the transformed segmented character to the candidate character by calculating a comparison score and, if the calculated score is within a predetermined range, identifying the segmented character with the candidate character.

Furthermore, in accordance with embodiments of the present invention, there is provided a data processing system for performing adaptive optical character recognition on a document with distorted characters. The system includes a processor; a computer usable medium connected to processor. The computer usable medium contains a set of instructions to perform a distortion-correction transformation on a segmented character of the document assuming the segmented character to be a candidate character; and to compare the transformed segmented character to the candidate character by calculating a comparison score and, if the calculated score is within a predetermined range, identifying the segmented character with the candidate character.

BRIEF DESCRIPTION OF THE SEVERAL VIEWS THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart/s and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A hybrid adaptive OCR method in accordance with embodiments of the present invention includes an adaptive mechanism for character recognition. For the purpose of this description, "character" should be understood as referring to any letter or part of a letter, numeral, ideogram, punctuation mark, mathematical or other symbol, or any other structured mark that appears repeatedly in a document. A "document" may include a book, newspaper, magazine, scroll, or sheet, or part of any of the above. The document typically includes material that is printed or written in an approximately consistent manner. For example, the document may contain material that was printed with a single character set or font, or with a set of similar fonts, or that was written by a trained scribe or calligrapher in an approximately consistent handwriting.

The adaptive mechanism is capable of adapting to a text being processed. The adaptive mechanism may be applicable to a wide variety of scanned material. For example, the adaptive mechanism may be applicable to older books and printed material that include a relatively large body of homogenous printed material, even when printed using rare old fonts.

The recognition process is based on creating an idealized representation of each character, which may be referred as a character template or "super-symbol". Creation of a super-symbol may be automatic or may be assisted by manual data entry. For example, creation of a super symbol may include application of a feature based OCR algorithm or engine. Segmentation of the printed material into characters so as to enable recognition may also include an adaptive technique in which segmentation is based on previous identification of characters.

A template matching algorithm may apply a hierarchical optical flow technique to classify each previously unclassified segmented character by comparison with the set of super-symbols. Classification of characters is typically based on a hybrid approach combining feature-based matching based on measurement of geometrical differences and application of distortion gradients. The hybrid approach may enable successful classification of a character even when distorted.

For example, application of a feature based OCR engine may initially identify high-confidence characters. As part of a training stage, a training algorithm may extract common features from high-confidence characters identified as representing a single character of a character set. The extracted common features may define a super-symbol representing the character of the character set. A classification algorithm may identify remaining characters with one or more of the initially defined super-symbols. The classification algorithm may form clusters from among yet unidentified characters of the document, each cluster including characters of similar shape. In such a manner large groups of similar characters are identified (even if their meaning is unknown to begin with). Optionally, manual input by a user familiar with the content of the document may define the meaning of a cluster. For example, manual input may identify a cluster with a known character. The algorithm may extract common features of the cluster to create a new super-symbol, adding the new super-symbol to the library or database of super-symbols for the document. The algorithm may include repeating this process iteratively until all characters are identified. In such a manner, an adaptive OCR engine can handle documents whose content includes a rare font or an unknown language. Similarly, adaptive OCR may thus identify and successfully convert to indexable text a ligature or other symbolic representation.

Figure 1A:
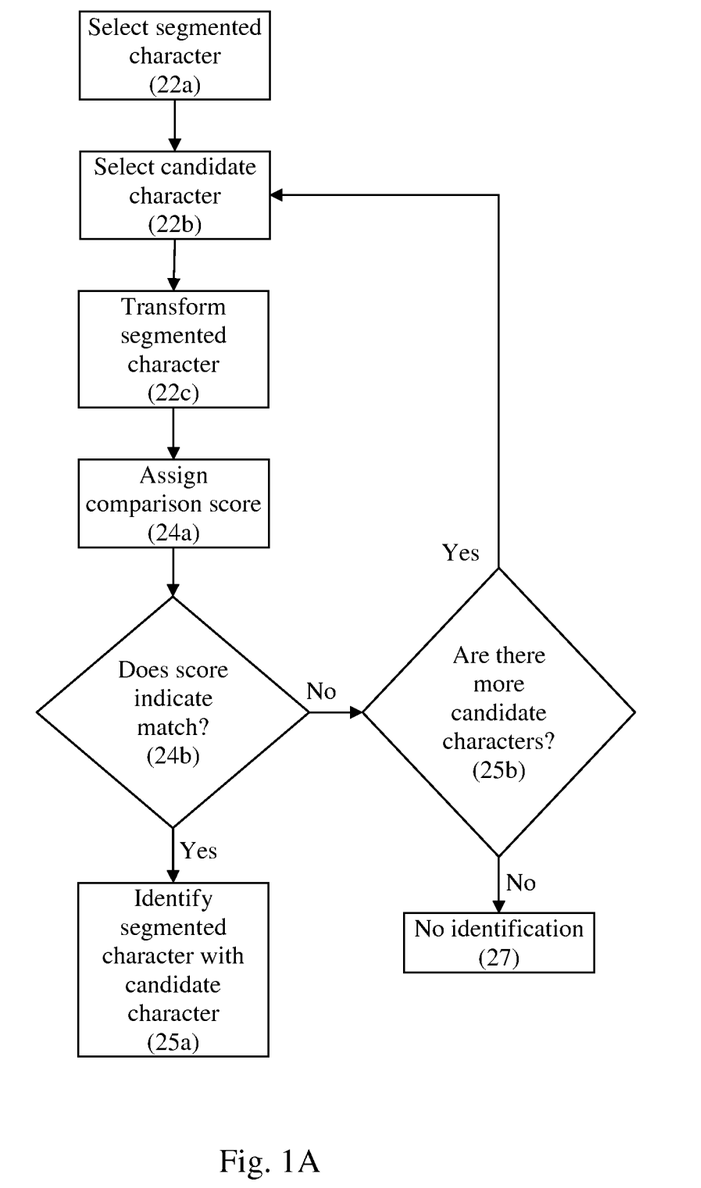
FIG. 1A is a flowchart of a character comparison method in accordance with embodiments of the present invention.

An adaptive OCR method in accordance with embodiments of the present invention includes finding a match between a segmented character of the document and another candidate character. FIG. 1A is a flowchart of a character comparison method in accordance with embodiments of the present invention. The method includes selecting a character to be matched from among the segmented characters of the document (step 22a). The method includes selecting a candidate character from a group of candidate characters (step 22b). For example, the group of candidate characters may include a set of super-symbols, or a set of previously unidentified segmented characters from the same document. Selection of a candidate character may include application of preliminary coarse criteria for removing from consideration as a candidate character any character that is unlikely to yield a match. Typically, the method includes applying a transformation to the segmented character in order to modify its shape to shape more closely resembling the shape of the candidate character (step 22c). Typically, the transformation may include applying a displacement vector to each pixel of the segmented character. The result may be a vector field describing the transformation.

The method includes assigning a current score to the current pairing of the segmented character with the candidate character (step 24a). For example, the score may be a function of a difference between an image of the candidate character and an image of the transformed segmented character. The score may also be a function of a result of analysis of the transformation vector field, for example the divergence of the vector field. The method includes comparing the assigned score with criteria to determine whether or not the assigned score indicates a match (step 24b). For example, a current score in a predetermined range may indicate a possible match. Further comparison of the current score with scores assigned to other pairings of the segmented character with other candidate characters may determine whether the current score indicates a best match.

If the current score indicates a match (and comparison with other candidate pairings indicates a best match), the method may include classifying (at least temporarily) the segmented character in a class of characters associated with the candidate character (step 25a). If the current score does not indicate a best match (e.g. the score is not in a predetermined range, or the current score is less optimum than the score assigned to another pairing) and there are other candidate characters (step 25b)), steps 22b-24b are repeated with a different candidate character. If there are no other candidate characters and no best match was found, the segmented character remains unidentified, at least for a current iteration (step 27).

Figure 1B:
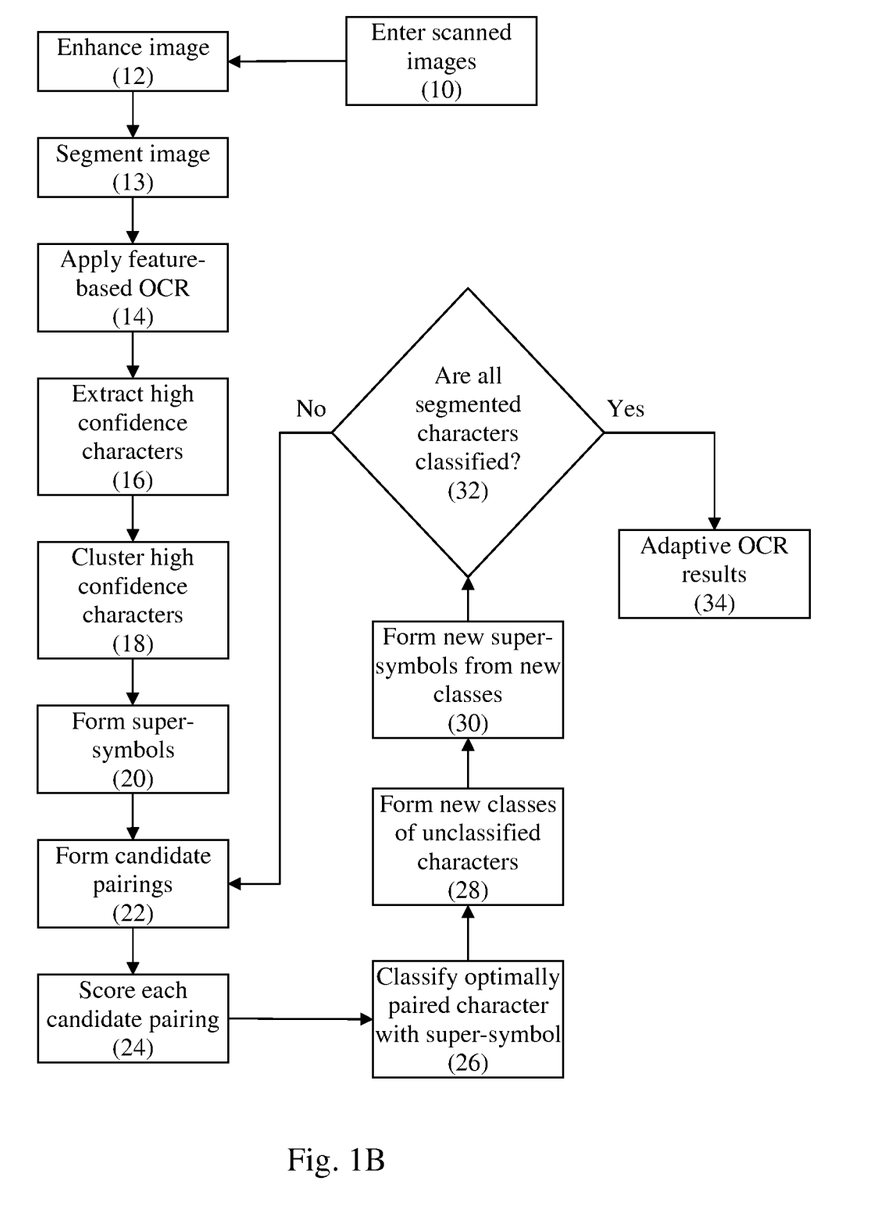
FIG. 1B is a flowchart of an adaptive OCR method in accordance with some embodiments of the present invention.

FIG. 1B is a flowchart of an adaptive OCR method in accordance with some embodiments of the present invention. For example, an adaptive OCR software program implementing the adaptive OCR method may operate on a set of scanned images of a document containing related, homogenous content (step 10). For example, the homogenous content may include text written in one or more similar fonts and a single alphabet.

Typically, content of a document regions where ink, paint, or another similar colored material has been deliberately deposited on paper, parchment, or another similar background material so as to form marks. In document content into characters, the adaptive OCR program distinguishes the deposited marks from the background material. However, staining, soiling, watermarking, aging, or other darkening or discoloration may affect the appearance of the background material. Similarly, fading, discoloration, chipping, scratching, or other deterioration may affect the appearance of the deposited marks. Such discoloration or deterioration may impede distinguishing the deposited marks from the background. The adaptive OCR method may include application of an enhancement technique to the scanned images (step 12). Application of an enhancement technique may facilitate distinguishing between the printed marks and the background. For example, an enhancement technique may include application of a standard binarization technique to image of the printed material. A typical binarization technique may apply one or more fixed or adaptable thresholds to an image in order to assign to each pixel of the image one of two values (e.g. a value indicating black or a value indicating white). An enhancement technique may facilitate detection of edges between the marks and the background. For example, and enhancement technique may include application of a low-pass spatial filter to reduce image noise. An enhancement technique may also include application of a technique for eliminating effects of page warping.

The adaptive OCR method may include application of one or more layout analysis and segmentation techniques to the image (step 13), as are known in the art. For example, an applied segmentation technique may include hierarchically segmenting an image into columns or blocks of text, lines of text, words, and characters. For example, the applied segmentation technique may include a trainable statistical model known in the art. For example, the applied segmentation technique may include identifying rectangles in the background of the image of the document.

A segmented character may or may not correspond to an image of a complete character. In accordance with embodiments of the present invention, the identities of characters of the printed material (e.g. alphabet and font) are assumed to be unknown a priori. The applied segmentation technique may, therefore, initially "over-segment" a word image into a relatively large number of fractions, each fraction being a segmented character. Typically, each segmented character includes a single contiguous printed mark. Therefore, the segmentation technique may segment a letter or symbol that includes, for example, multiple disconnected marks or diacritical marks, into multiple segmented characters. For example, the segmentation technique may segment a character in standard printed English such as a lower case dotted letter "i" or "j", a punctuation mark such as a question mark or a semicolon, or a symbol such as a percent sign or an equals sign, into two or more segmented characters.

The adaptive OCR method may include application of a conventional or standard feature-based OCR engine as known in the art (e.g. Omni OCR) to the segmented image (step 14).

A conventional feature-based OCR engine may identify one or more characters in the document image with a character of a character set. For example, the feature-based OCR engine may attempt to find a match between features of a segmented character (or a combination of adjacent segmented characters) and features of a character in a character database. The feature-based OCR engine may assign a confidence level to each character match in accordance with predetermined criteria. For example, the confidence level may depend on a fraction of features that match.

The adaptive OCR method may include tentatively combining two or more adjacent segmented characters into a single proposed character. The proposed character constitutes a hypothesis regarding the combination, subject to confirmation or rejection. The adaptive OCR may hypothesize more than one combination of a segmented character with an adjacent segmented character into a set of several proposed characters that incorporate a single segmented character. A character recognition module of the conventional OCR engine may test each hypothesized proposed character. The character recognition module may then select a hypothesized proposed character from the set of proposed characters that is identifiable with the highest level of confidence.

Typically, the conventional OCR engine may identify some characters with a high level of confidence (step 16). For example, the high confidence character may match a character template of the conventional OCR engine. As another example, the conventional OCR engine may cooperate with a spelling checking program, for example, if the imaged material represents text in a known language. Successful recognition by the spelling checker of a word that includes an identified character may increase the confidence of the identification. Thus, each high confidence character may be associated with a character of a character set.

The adaptive OCR method may include enabling manual input to supplement, or substitute for, high confidence character identification by the conventional OCR engine. For example, a user who is familiar with the language of the printed material may input the identification of one or more segmented characters with high confidence. For example, the method may include displaying a list of segmented characters to a user at least partially familiar with the font or language of the document. The user may then identify one or more characters with a known character from a character set.

An adaptive OCR method in accordance with embodiments of the present invention includes a training process for identification of the segmented characters. The training process includes classifying high confidence characters into clusters of high confidence characters (step 18). For example, each character cluster may include all or part of the high confidence characters that were identified as matching a single character of a character set by the feature-based OCR engine. The training process includes creating an idealized representation of the character cluster in the form of a super-symbol. Creation of the super-cluster includes analysis of the character members of each high confidence character cluster. Analysis of the character cluster may include registering and adjusting the shape of one or more characters in the cluster. For example, a character in a cluster may be enlarged, reduced, or rotated in order to match the size and orientation of another character of the cluster. After adjustment, extraction of common content of the characters that are members of the character cluster may result in formation of a super-symbol representing the cluster (step 20). For example, extraction of common content may include calculation of an average of the characters in the cluster.

Figure 2:
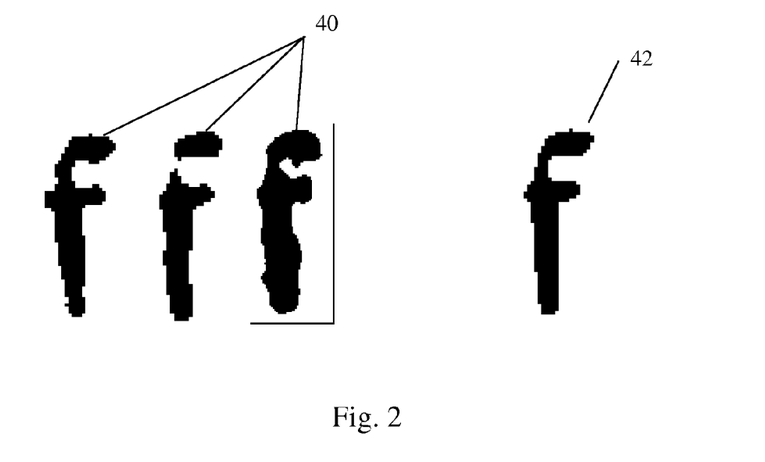
FIG. 2 illustrates a super-symbol created on the basis of a character cluster, in accordance with embodiments of the present invention.

FIG. 2 illustrates a super-symbol created on the basis of a character cluster, in accordance with embodiments of the present invention. Registration and adjustment of segmented characters 40 may result in all of segmented characters 40 having approximately identical overall dimensions and orientations. The adaptive OCR method includes extraction of common content of segmented characters 40, for example, by calculating an average of segmented characters 40. Extraction of common features from segmented characters 40 may result in creation of super-symbol 42.

Typically, after identification of high confidence characters and creation of super-symbols, segmented characters may remain unidentified. For example, an image of a poorly preserved document or of a document in a previously unknown font may contain characters not identifiable by feature-based OCR. An adaptive OCR method in accordance with embodiments of the present invention may include attempting to match each remaining unidentified character with a best-matching super-symbol. The adaptive OCR method may include forming one or more candidate pairs of each remaining segmented character with one or more candidate super-symbols (step 24), in the attempt to match the segmented character with a best-match super-symbol. The adaptive OCR method may include preliminary testing of a possible match between an image of a current segmented character and an image of a candidate super-symbol. For example, preliminary testing may include comparison of coarse features of the images. For example, presence of a coarse feature in one of the images and its absence in another may indicate that it is unlikely that one image is a distorted version of the other. In such a case, the adaptive OCR method may include eliminating such an unlikely pairing from further consideration.

In forming a candidate pair, the adaptive OCR method may include application of a distortion compensation module to the candidate pair. Input to the distortion compensation module typically includes an image of a current segmented character and an image of a candidate super-symbol. The distortion compensation module may return as output an adjusted version of the current segmented character.

Image distortion compensation may include performance of a coarse registration operation on the current segmented character. Typically, the coarse registration is based on a cross-correlation technique or on centroid-based registration, as known in the art. For example, coarse registration may compensate for any translational or uniform scaling differences between the images of the current segmented character and of the candidate super-symbol.

Image distortion compensation may include application of a nonlinear compensation algorithm. Nonlinear compensation may compensate for possible nonlinear differences between the shape of the current segmented character (possibly after coarse registration) and of the candidate super-symbol. Nonlinear compensation of an adaptive OCR method in accordance with embodiments of the present invention typically includes application of a hierarchical optical flow technique. An optical flow technique essentially treats two images to be compared as two successive images made at two successive points in time. Thus, analysis of differences between the two images is essentially equivalent to analysis of differences due to movement in two successive frames of a video image. The hierarchical optical flow technique may include, for example, implementation of a three-level coarse-to-fine warping strategy.

The nonlinear compensation algorithm may include a second-order regularization term. The regularization term may inhibit a distortion compensation that is atypical of distortion of imaged printed material. For example, a regularization term may include first-order derivatives of a vector optical flow field. Such a term may penalize such phenomena as vorticity, divergence, or gradient of components of the vector optical flow field.

For example, a regularization term based on second-order derivatives of the optical field may limit the spatial variation of the vortices. For example, given an optical flow vector field f, the regularization term in this case can be expressed in terms of div(f) or curl(f). Alternatively, expressing the regularization term in terms of the Laplacian of components of f may simplify computation.

Given two similar images, an optical flow process may calculate a "velocity" vector that represents the magnitude and direction of the difference in position between a pixel of one image and a corresponding pixel in the other. The optical flow process may determine the correspondence between each pixel of one image and each pixel of the other by use of a variational technique. For example, application of an optical flow process may assign to a pixel at coordinates (x,y) a velocity vector (u,v). A pair or set of images may be described as I(x(t),y(t),t), where the "time" coordinate t represents successive images of a set of related images. For example, the optical flow process may obtain optimal values of velocity components u,v by minimizing a functional in the form of:

$$F(u,v) = \int_\Omega (I_x u + I_y v + I_t)^2 dx dy + \alpha \int_\Omega (|\nabla u|^2 + |\nabla v|^2) dx dy + \beta \int_\Omega ((|\Delta u|^2 + |\Delta v|^2)) dx dy.$$

The symbol $\Omega$ denotes the image domain.

Figure 3:
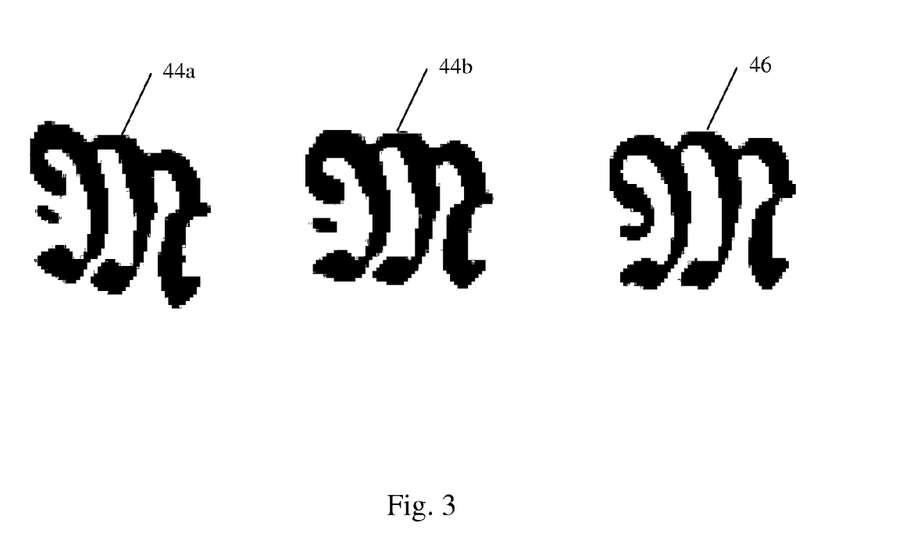
FIG. 3 illustrates application of nonlinear distortion compensation to the image of a segmented character.

A nonlinear compensation algorithm may include application of a nonlinear correction based on the calculated optical flow vector field to an image of a current segmented character. Application of the nonlinear correction to the image of the segmented character may modify the shape of the current segmented character so as to more closely match the shape of a super-symbol. FIG. 3 illustrates application of nonlinear distortion compensation to an image of a segmented character. A nonlinear distortion compensation algorithm may include calculating a nonlinear correction based on comparison of an image of segmented character 44a and super-symbol 46. Application of the nonlinear correction to the image of segmented character 44a may modify the shape of segmented character 44a to the shape of modified segmented character 44b. The shape of modified segmented character 44b more closely resembles the shape of super-symbol 46 than does the shape of segmented character 44a. (However, the shape of modified segmented character 44b is not identical to the shape of super-symbol 46.)

An adaptive OCR method may include application of two or more nonlinear corrections to a single image of a segmented character. For example, preliminary testing may indicate two or more candidate super-symbols. For example, two or more characters of a font may have similar shapes such that preliminary testing may not be capable of distinguishing between them. Therefore, an adaptive OCR method in accordance with embodiments of the present invention may assign a score that quantifies the quality of the match of a segmented character to each of the candidate super-symbols (step 24). For example, the assigned score may be based on the difference between a modified segmented character image after application of a nonlinear correction and the candidate super-symbol image, as well as on a measure of the degree of warping between the two images.

For example, assignment of a score may include evaluation of an image difference diff between an image $B_{CC}$ of a current transformed segmented character and an image $B_{SS}$ of a candidate super-symbol. For example, the image difference may be expressed in a accordance with an image difference formula in the form of:

$$\text{diff} = (\overline{B}'_{CC} \Omega B_{SS}) \cup (\overline{B}'_{SS} \Omega B_{CC}).$$

The prime symbol in the image difference formula denotes a dilation operation, typically with a 3×3 structuring element. The overhead bar indicates the negative of the image. The calculated diff typically indicates only those differences between the images that are great enough to exceed a limit determined by the structuring element. Thus, application of the adaptive OCR method may yield a calculated image difference diff describing the differences between images of the current transformed segmented character and a candidate super-symbol.

Application of the adaptive OCR method may also yield a vector field describing the non-linear distortion compensation applied to the segmented character in order to match the candidate super-symbol. For example, the vector field may include a calculated optical flow vector field f=(u,v) that indicates optical flow between images of the current segmented character and the candidate super-symbol.

The adaptive OCR method may include assigning a score to the match between the current segmented character and the candidate super-symbol, the score being based on diff and f.

For example, the assigned score may be based on a scoring formula of the form:

$$1 - \frac{\text{diff} + \gamma \left| \sum_{B_{SS}} \text{div}(\vec{f}) \right|}{\text{Area}(B_{ss})}.$$

The sum is over the pixels of image $B_{SS}$ of the candidate super-symbol. Assigning a score in accordance with the above scoring formula results in a relatively high score when diff is small (similar images), and when the total divergence div(f) of the optical flow vector field f is small.

Figure 4A:
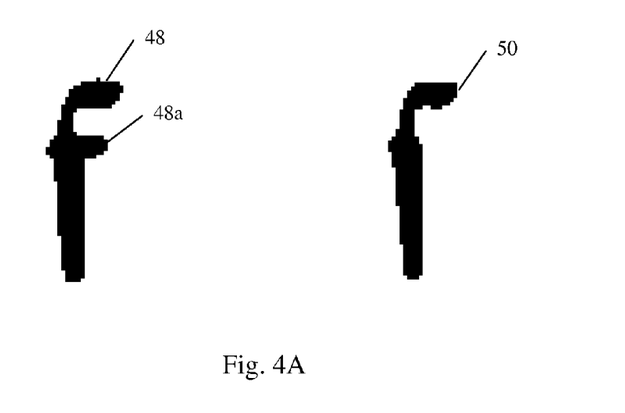
FIG. 4A shows a pair of images for comparison.
Figure 4B:
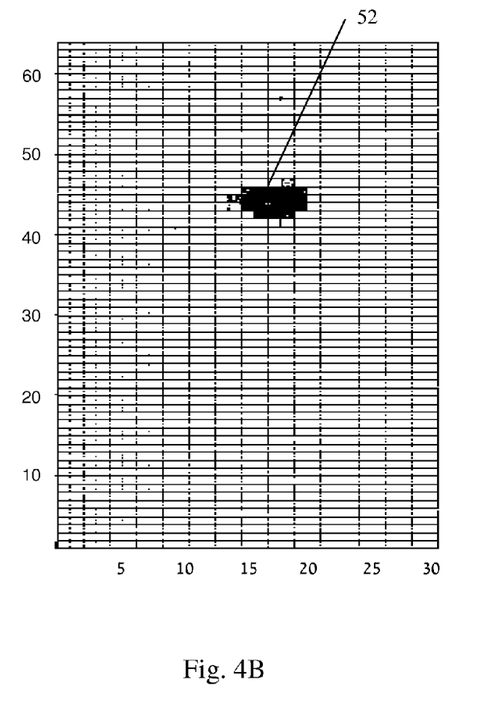
FIG. 4B is a two dimensional graph of optical flow vector field divergence for the pair of images shown in FIG. 4A.
Figure 4C:
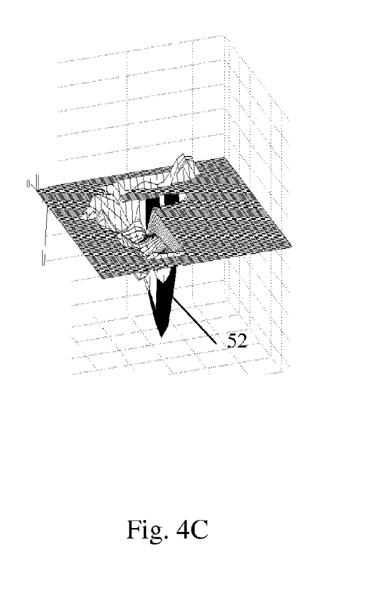
FIG. 4C is a three dimensional version of the graph shown in FIG. 4B.

For example, the presence of divergence in the optical flow vector field may indicate the presence of qualitative feature differences between the images, and not merely distortion of the image. FIG. 4A shows a pair of images for comparison. Comparison of current segmented character image 48 (of a Gothic font lowercase "f") with candidate super-symbol image 50 (of a Gothic font lowercase "s") includes a qualitative difference, line 48a of current segmented character image 48 (the line crossing the "f"). FIG. 4B is a two dimensional graph of optical flow vector field divergence for the pair of images shown in FIG. 4A. FIG. 4C is a three dimensional version of the graph shown in FIG. 4B. Feature 52 of the graphs, indicating divergence values that noticeably deviate from zero, corresponds to line 48a of current segmented character image 38. A net divergence in the sum of divergences over the entire graph may indicate an asymmetric divergence indicative of non-random deviations. Thus, assignment of a score in accordance to the above scoring formula to the pairing of current segmented character image 48 and candidate super-symbol image 50 may yield a relatively low score. A relatively low score may indicate a poor match between the images.

Thus, application of the adaptive OCR method may include forming one or more candidate pairings between a current segmented character and one or more candidate super-symbols. Application of the adaptive OCR method may include assigning a score corresponding to each candidate pairing. One of the assigned scores may be an optimum score, indicating that its corresponding pairing is a better match than the others. Application of the adaptive OCR method may also include verifying whether an optimum score indicates a plausible match. For example, the adaptive OCR method may include comparing an optimum or other score to a predetermined threshold value or range of values. For example, if the score is within a predetermined range of scores, the score may indicate an acceptable match. If the optimum score indicates a good match between the current segmented character and one of the candidate super-symbols, application of the adaptive OCR method may classify the current segmented character in a class associated with that candidate super-symbol (step 26). Typically, adaptive OCR method does not include updating the shape of the super-symbol when a current segmented character is classified with the super-symbol.

Segmented characters may remain that had not been classified into one of the classes associated with a super-symbol. Application of the adaptive OCR method may then include comparing the shapes of at least some of these unclassified segmented characters to one another. The method may further include formation of one or more new classes containing at least some of these remaining unclassified segmented characters based on the compared shapes (step 28). For example, the adaptive OCR method may include applying the methods described above (e.g. steps 22-26) to form candidate pairs of unclassified segmented characters, to assign a score to each candidate pair, and to classify the segmented characters of a candidate pair together into a new class when the assigned score indicates that such classification is warranted.

After classifying remaining unidentified segmented characters into new classes, the adaptive OCR method may include constructing a new super-symbol corresponding to each new class (step 30). An adaptive OCR method may include a collaborative correction system that enables a user to input information enabling identification of a new super-symbol. For example, computer system running a method in accordance with some embodiments of the present invention may enable a user to identify high quality characters within the class from which to form a super-symbol. The system may enable a user to provide an identification of the class with a known alphanumeric character.

The adaptive OCR method may include checking if all segmented characters have been classified into a class associated with a super-symbol (step 32). If not, the adaptive OCR method may include repeating the forming and evaluation of candidate pairings (steps 22-26) with the new set of super-symbols. (The new set of super-symbols includes both those super-symbols originally identified in step 20, and the super-symbols newly identified in step 30.) Again, the adaptive OCR method may include repeating the formation of new super-symbols from any remaining unclassified (steps 28-30).

A result of the adaptive OCR method may be an OCR engine optimized for a particular set of scanned printed material, such as a book. Once each segmented character is classified into a class associated with a super-symbol, the adaptive OCR method may enable outputting the results (step 34).

Results may include text that is indexable in accordance with the set of super-symbols. Manual input identifying at least some of the super-symbols in terms of characters of a known alphabet may enable conversion of the text to text in a modern font.

Testing of the adaptive OCR method by application to a set of 101 scanned pages of a book printed in an Eighteenth Century Old German Gothic font demonstrated some of the advantages of the adaptive OCR method over commercially available state-of-the-art OCR. Results of application of the adaptive OCR method (18,321 individual words) required only approximately half the number of manual corrections that the result of application of the commercially available OCR required.

Figure 5:
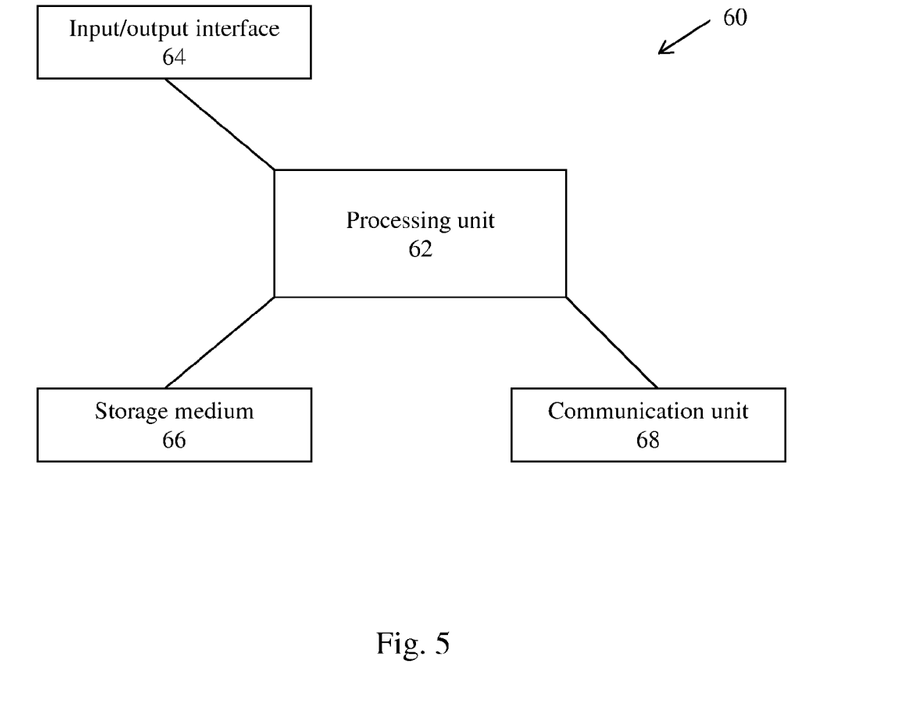
FIG. 5 is a schematic diagram of a computerized system for adaptive OCR in accordance with embodiments of the present invention.

FIG. 5 is a schematic diagram of a computerized system for adaptive OCR in accordance with embodiments of the present invention. Computerized system 60 may include a processing unit 62, which may include a single processor or a plurality of processors. Processing unit 62 may communicate with an input/output unit 64. Input/output unit 64, may include, for example, a keyboard, a pointing device, a touch screen, a printer, a scanner, or a monitor. Processing unit 62 may include a storage medium 66 on which a computer executable program may be stored, which includes instructions to perform a method according to embodiments of the present invention. Storage medium 66 may include, for example, a hard-disk, flash memory, floppy disk, disk-on-key. Processing unit 62 may include a communication unit 68 for communicating with another system across a communication line or a network, over a communication wire or wires or wirelessly.

What is claimed is:

1. A computer implemented method for performing adaptive optical character recognition on a document with distorted characters, the method comprising:
providing a group of images of candidate characters;
receiving a document in an image format;
segmenting the document so as to provide a sub-image of a segmented character; and
for one or more of the candidate characters:
performing a distortion-correction transformation on the segmented character, so as to modify the segmented character in the sub-image into a transformed character more closely resembling the candidate character;
comparing the transformed segmented character to the candidate character so as to calculate a comparison score;
analyzing the distortion-correction transformation so as to assign the transformation a distortion score; and
determining whether to identify the segmented character with the candidate character, responsively to both the comparison score and the distortion score.

2. A method as claimed in claim 1, wherein the transformation comprises a vector field that describes a change in shape between the segmented character and the candidate character and the distortion score comprises a divergence of the vector field.

3. A method as claimed in claim 2, wherein the vector field is an optical flow vector field.

4. A method as claimed in claim 1, wherein calculating the comparison score comprises calculating a difference between the transformed segmented character and the candidate character.

5. A method as claimed in claim 1, wherein the candidate character is a candidate super-symbol.

6. A method as claimed in claim 1, wherein comparing the transformed segmented character to the candidate character comprises performing template matching optical character recognition.

7. A method as claimed in claim 1, wherein comparing the transformed segmented character to the candidate character comprises performing feature-based optical character recognition.

8. The method of claim 1, wherein performing the distortion-correction transformation comprises performing a non-linear transformation.

9. The method of claim 1, wherein performing the distortion-correction transformation comprises performing a transformation which does not bring the segmented character to be identical with the candidate character.

10. The method of claim 1, wherein determining whether to identify the segmented character with the candidate character comprises calculating a composite score as a function of the comparison score and the distortion score.

11. The method of claim 10, wherein determining whether to identify the segmented character with the candidate character comprises determining a candidate character of the group that achieves a best composite score.

12. The method of claim 10, wherein determining whether to identify the segmented character with the candidate character comprises determining whether the composite score is above a threshold.

13. A computer program product stored on a non-transitory tangible computer readable storage medium for performing adaptive optical character recognition on a document with distorted characters, the computer program including code for:
   providing a group of images of candidate characters;
   receiving a document in an image format;
   segmenting the document so as to provide a sub-image of a segmented character; and
   for one or more of the candidate characters:
      performing a distortion-correction transformation on the segmented character, so as to modify the segmented character in the sub-image into a transformed character more closely resembling the candidate character;
      comparing the transformed segmented character to the candidate character so as to calculate a comparison score;
      analyzing the distortion-correction transformation so as to assign the transformation a distortion score; and
      determining whether to identify the segmented character with the candidate character, responsively to both the comparison score and the distortion score.

14. A computer program product as claimed in claim 13, wherein the transformation comprises a vector field that describes a change in shape between the segmented character and the candidate character and the distortion score a divergence of the vector field.

15. A computer program product as claimed in claim 14, wherein the vector field is an optical flow vector field.

16. A computer program product as claimed in claim 13, wherein the candidate character is a candidate super-symbol.

17. A data processing system comprising:
   a processor;
   a computer usable medium connected to the processor, wherein the computer usable medium contains a set of instructions for performing adaptive optical character recognition on a document with distorted characters, wherein the processor is designed to carry out a set of instructions to:
   provide a group of images of candidate characters;
   receive a document in an image format;
   segment the document so as to provide a sub-image of a segmented character; and
   for one or more of the candidate characters:
      perform a distortion-correction transformation on the segmented character, so as to modify the segmented character in the sub-image into a transformed character more closely resembling the candidate character;
      compare the transformed segmented character to the candidate character so as to calculate a comparison score;
      analyzing the distortion-correction transformation so as to assign the transformation a distortion score; and
      determining whether to identify the segmented character with the candidate character, responsively to both the comparison score and the distortion score.

18. A data processing system as claimed in claim 17, wherein the transformation comprises a vector field that describes a change in shape between the segmented character and the candidate character and the instructions for calculating the distortion score comprise instructions to calculate a divergence of the vector field.

19. A data processing system as claimed in claim 18, wherein the vector field is an optical flow vector field.

20. A data processing system as claimed in claim 17, wherein the candidate character is a candidate super-symbol.

* * * * *